UNITED STATES PATENT OFFICE.

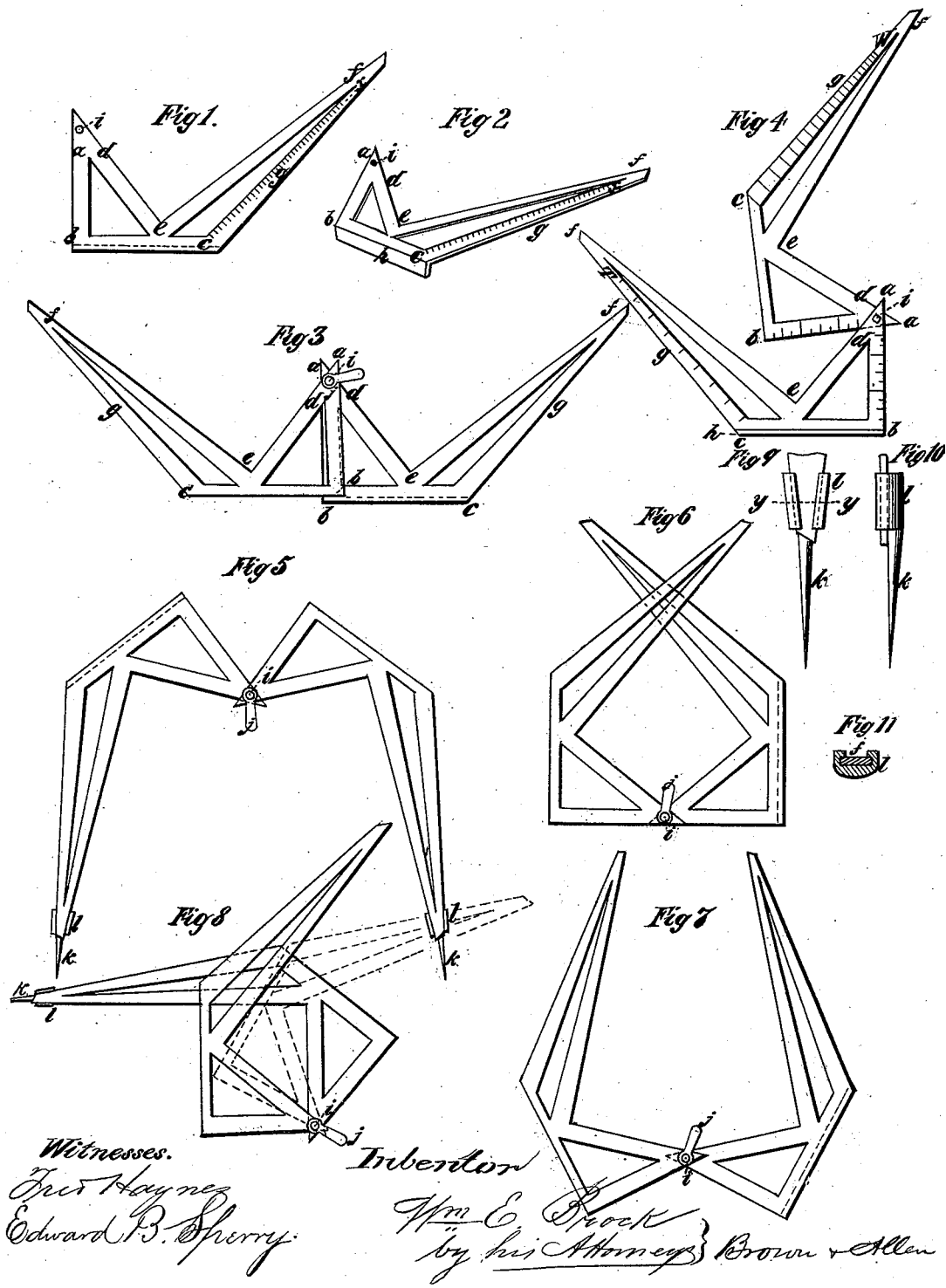

WILLIAM E. BROCK, OF NEW YORK, ASSIGNOR TO JOHN J. TOWER, OF BROOKLYN, N. Y.

IMPROVEMENT IN COMBINED BEVEL, SQUARE, COMPASSES, CALIPERS, &c.

Specification forming part of Letters Patent No. 196,188, dated October 16, 1877; application filed July 23, 1877.

*To all whom it may concern:*

Be it known that I, WILLIAM E. BROCK, of the city and State of New York, have invented an Improved Combination Tool, applicable as a Square, Try-Square, Bevel-Square, Calipers, Compasses, and for other purposes; and I do hereby declare that the following is a full, clear, and exact description of the same, reference being had to the accompanying drawing, forming part of this specification.

My invention has for its object the combination, in a single implement, of an outside and inside square or squares, a bevel or miter square or squares, an instrument for describing without measurement a great variety of angles, and with measurement of any angle whatever, a gage or gages for sizing wire tools, screws, &c., an outside and inside calipers, compasses, or dividers, and a planer-scribe for setting work level and parallel on planing-machines.

The tool is also applicable to some other purposes, and it forms a most useful and convenient bench-tool, by which a great variety of measurements and adjustments can be rapidly and accurately made, and the "laying out" of work can be greatly facilitated.

By the use of the tool the chief angles necessary to be laid out in a great variety of bench-work and carpenter-work can be described without the employment of any other implement except a pencil or scratch-awl.

The tool consists of two parts conjoined by a pivot, as hereinafter described.

Each of the parts consists of an outside and inside square, placed and united with each other in angular relation. One of the parts has a flange, which acts as a base or support for the instrument in describing angles, and in the use of the tool as a bevel or miter square. Each of the said parts is furnished with a detachable point, which may be applied to the instrument when it is to be used as a dividers, compasses, or planer-scribe, and removed when the instrument is employed for other purposes.

The said outside and inside squares are so placed and united together that triangular interspaces are left, and, the edges of the metal plate bounding the said triangular interspaces or openings being graduated into suitable scales, a variety of convenient gages may be obtained.

Figures 1 and 2 in the accompanying drawing are, respectively, a side view and a perspective view of the parts of the instrument, which are pivoted together, and are similar in general form, except that one has a flange, as shown in Fig. 2. Fig. 3 shows the two parts pivoted together. Fig. 4 shows the parts pivoted together in a different relation from that shown in Fig. 3. Fig. 5 shows the parts with points attached, and pivoted together for use as compasses. Fig. 6 shows the parts pivoted together and adjusted for use as inside calipers. Fig. 7 shows the parts pivoted together and adjusted for use as outside calipers. Fig. 8 shows the parts pivoted together and adjusted for use as a planer-scribe. The dotted outline in this figure also shows the instrument adjusted for use as a cross-bevel square. Figs. 9 and 10 are, respectively, a side view and a cross-section of one of the detachable points. Fig. 11 is a cross-section on the line $y\,y$ in Fig. 9.

Each of the parts of the instrument designed to be pivoted together or to be used by itself is composed of an inside square, $a\,b\,c$, and an outside square, $d\,e\,f$, united in angular relation at $d$ and $c$.

Said squares are preferably, but not necessarily, formed of a single piece of sheet metal, punched in blank, and afterward fitted to the required accuracy.

The lower blade of the square $a\,b\,c$ preferably extends outward beyond the junction $c$ of the two squares to a distance, $e\,c$, the extremity of the extension $e\,c$ being connected with the end $f$ of the square $d\,e\,f$ by a bar, $g$, formed in one piece with the said squares.

The said outside and inside squares may have different angular relations with each other for special purposes; but for general use as a bench-tool I prefer to place the said squares in such manner that the blade $e\,f$ forms an angle of thirty-four (34) degrees, and the blade $d\,c$ forms an angle of fifty-six (56) degrees with the blade $b\,c$, and to make the blade $e\,f$ of such length that its extremity $f$ may be joined to the extremity $c$ of the blade $b\,c$ by the bar $g$, in such manner that the outer edge of the bar $g$ shall form an angle of forty-five (45) degrees with the said blade $b\ c$. The blade $e\ f$, the extension $e\ c$ of the blade $b\ c$, and the bar $g$ inclose a triangular space, and the blades $e\ f$ and the bars $g$ may be graduated with scales, in such manner that tools, screws, and wire may be gaged by inserting them in the said triangular space. These scales are shown in Figs. 1, 2, and 4, the scale marked T being for a tool-gage, that marked W being for a wire-gage, and that marked X being for a screw.

The flange $h$, Figs. 1 and 4, is supplied to aid the workman in placing the tool in accurate relation with a base-line, when such base-line is the straight edge of a piece of work upon which lines inclined to said base-line, or to a line parallel to said base-line, are to be drawn or marked. Said flange being placed against said straight edge, any of the angles formed by the edges of the instrument with said base-line may at once be drawn without measurement, and these angles are such as are of frequent occurrence in laying out work. The two parts of the instrument are united by a screw-pivot, $i$, and a nut, $j$, which may be a nut provided with a lever, or a thumb-nut, or which may be applied and removed by the use of a separate wrench.

Points $k$, with sockets $l$ for the reception of the extremities $f$ of the two parts of the instrument, are provided, said points being applied to the instrument when wanted for use as compasses or dividers or as a planer-scribe.

The part of the instrument shown in Fig. 2 may be used as a bevel-square, either by itself or when the two parts are pivoted together.

When the parts are pivoted together in either of the relations shown in Figs. 3 and 4, a variety of angles may be drawn, with any given base-line, without measurement and by measurement; and, by turning one part of the instrument on the pivot which connects the two parts, not only may a line be drawn having any angle with any given base-line, but when such line is drawn a variety of lines forming different angles with the line first drawn may be drawn without further measurement.

With the points $k$ applied, and the parts adjusted as shown in Fig. 5, convenient compasses and dividers are furnished. The parts being adjusted, as shown in Fig. 6, without the points, the instrument is ready for use as inside calipers. As adjusted in Fig. 7, the instrument may be used as outside calipers. As adjusted in full outline in Fig. 8, with one of the points applied to it, the instrument forms a serviceable planer-scribe. As adjusted in the same figure, partly in full and partly in dotted outlines, and without the points, the instrument forms a perfect cross-bevel square.

I claim—

1. The combination, in an instrument for drawing angles or for other purposes, of two parts pivoted together, and each composed of an inside square, $a\ b\ c$, and an outside square, $d\ e\ f$, united in angular relation, substantially as and for the purpose set forth.

2. The combination, with one of two parts, each consisting of the united squares $a\ b\ c$ and $d\ e\ f$, and pivoted together, as described, of a flange, $h$, to adapt the instrument for use as a bevel-square, substantially as and for the purpose specified.

3. The combination, with the two parts, each consisting of united inside and outside squares $a\ b\ c$ and $d\ e\ f$, pivoted together, as specified, of bars $g$, and suitable scales marked on the said squares or bars, or both, for use as gages for tools, wire-screws, or other articles, substantially as described.

4. The combination, with the two parts, pivoted together, each consisting of united squares $d\ e\ f$ and $a\ b\ c$ and the bar $g$, of socketed points $k$, to adapt the instrument for use as a planer-scribe or for compasses or dividers, substantially as and for the purpose set forth.

In testimony whereof I have hereunto signed my name in the presence of two subscribing witnesses.

WILLIAM E. BROCK.

Witnesses:
BENJAMIN W. HOFFMAN,
EDWARD B. SPERRY.